United States Patent

Pissenberger

[11] Patent Number: 5,444,938
[45] Date of Patent: Aug. 29, 1995

[54] DEVICE FOR VEE - GRAFTING

[75] Inventor: Siegfried Pissenberger, Vienna, Austria

[73] Assignee: Proglas Handelsgesellschaft m.b.H. & Co. KG, Vienna, Austria

[21] Appl. No.: 107,778

[22] PCT Filed: Oct. 14, 1991

[86] PCT. No.: AT91/00110
§ 371 Date: Aug. 11, 1993
§ 102(e) Date: Aug. 11, 1993

[87] PCT Pub. No.: WO92/06584
PCT Pub. Date: Apr. 30, 1992

[30] Foreign Application Priority Data

Oct. 12, 1990 [AT] Austria .............. A 2058/90

[51] Int. Cl.6 .................................. A01G 1/00
[52] U.S. Cl. .................................... 47/6
[58] Field of Search ........................... 47/6, 7

[56] References Cited

U.S. PATENT DOCUMENTS 340,699 4/1886 Congar ...................... 47/6

FOREIGN PATENT DOCUMENTS

| 236162 | 9/1987 | European Pat. Off. | 47/6 |
| 320662 | 12/1902 | France | 47/6 |
| 2539951 | 8/1984 | France | 47/6 |
| 157072 | 7/1903 | Germany | 47/6 |
| 1142462 | 1/1964 | Germany . | |
| 1208544 | 1/1966 | Germany . | |
| 80651 | 9/1918 | Switzerland | 47/6 |

Primary Examiner—Henry E. Raduazo
Attorney, Agent, or Firm—Herbert L. Lerner; Laurence A. Greenberg; Werner H. Stemer

[57] ABSTRACT

Device for Vee-grafting, especially for hard-and-stone-fruit trees, with an angled knife (8) for cutting a groove (K) in the stock (10) arranged to move in an outer part (2), formed as a guide space by means of a toggle lever (31, 32, 33), which is inclined in relation to the axis of the stock, characterized in that there is an inner part (3) moveable inside the outer part (2) in the forward region (3') or front end of which is fitted the knife (8) and in the rear region (3") of which there is an aperture (7) for the scion (12) and where the outer part (2) has an aperture (4) in its forward region (2') for the stock (10) and in its rear region (2") an aperture (5) which can be caused to coincide with the aperture (7) in the inner part (3) and has an angled knife (6) at the forward edge.

8 Claims, 5 Drawing Sheets

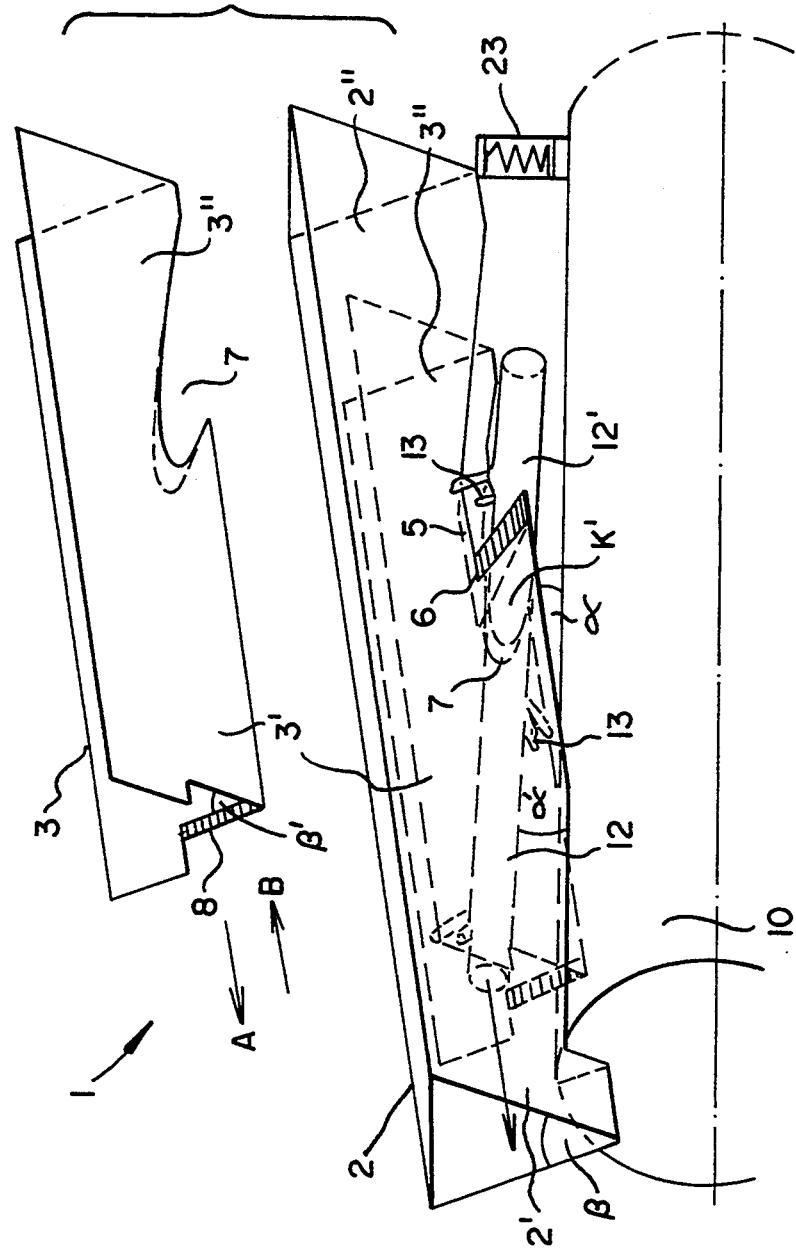
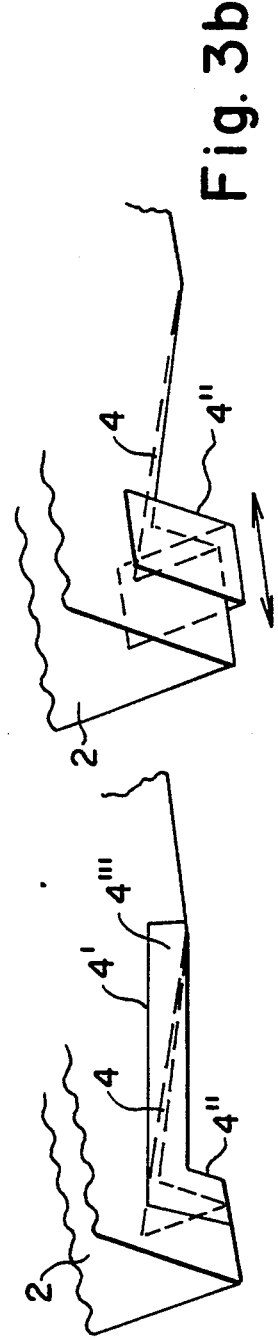

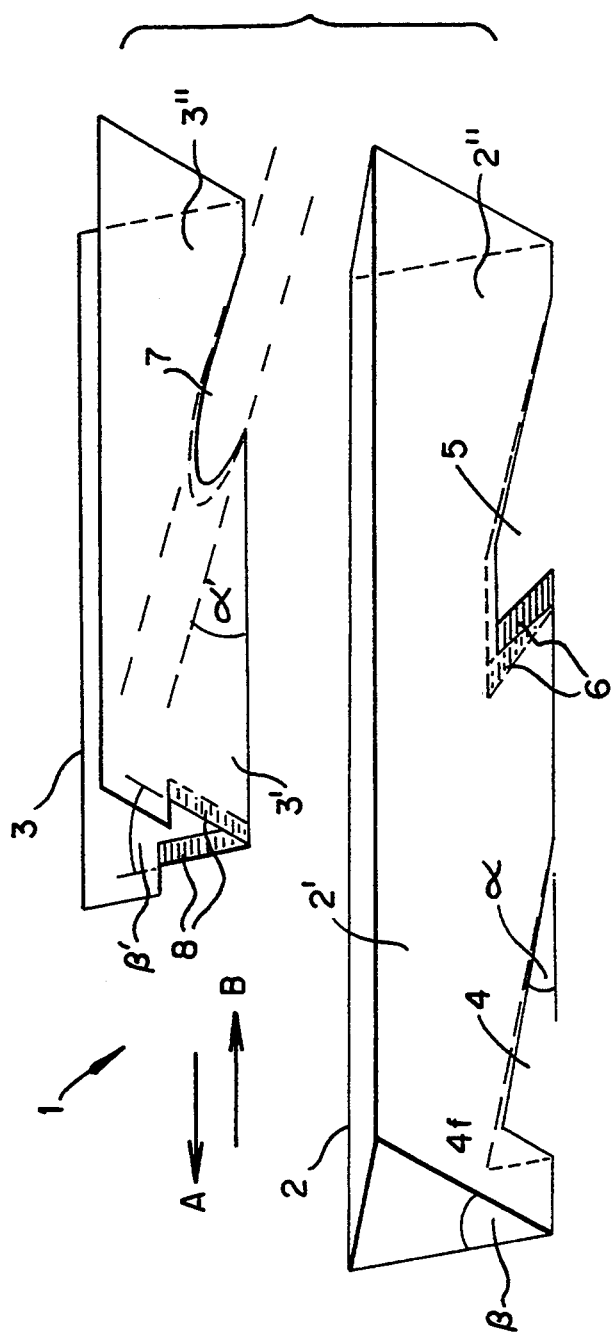

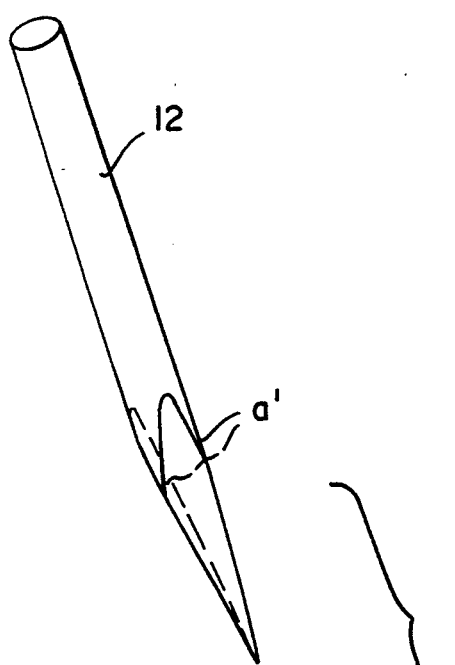
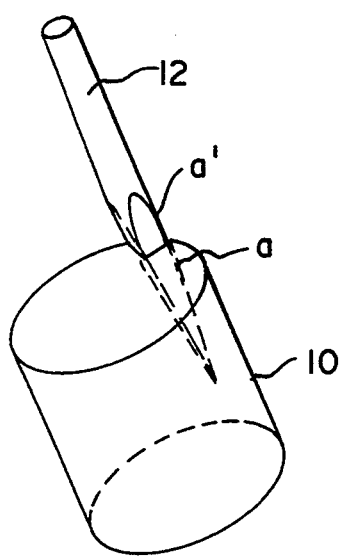
Fig. 9b
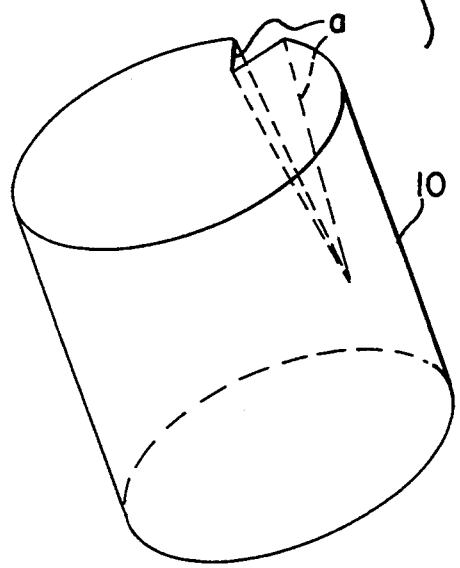
Fig. 9a
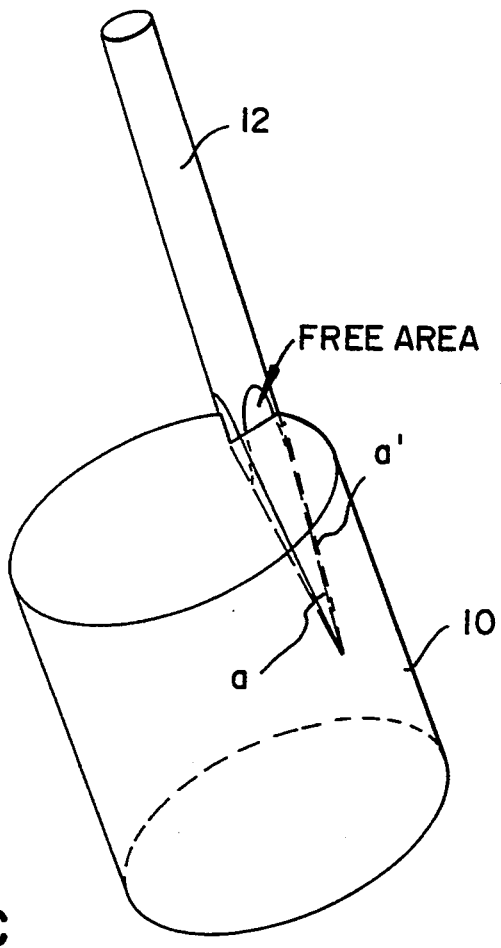
Fig. 9c

DEVICE FOR VEE - GRAFTING

BACKGROUND OF THE INVENTION

1. Field of the Invention

The invention pertains to a device for Vee-grafting, especially for hard-and-stone-fruit trees, with an angled knife for cutting a groove in the stock arranged to move in an outer part, formed as a guide space by means of a toggle lever, which is inclined in relation to the axis of the stock.

A prior art device for cutting a notch is described in DE-B-157 072. An angled knife is manually moved with a lever in a frame inclined against the stock such that a notch is cut with an increasing depth. With that device, however, a diametrically opposed wedge on the shaft of the scion cannot be made. As a consequence, such grafting must be made manually, whereby the forming of a notch in the stock and in the diametrically opposed wedge on the end of the scion generally takes a lot of time. In addition, the section planes become easily contaminated, presenting a risk for the grafting operation. It is further disadvantageous that the device cannot be disposed on stocks with arbitrary diameters if the length relative to the depth of the notch in the wooden part should be the same.

It is therefore the object of the invention to provide a grafting device with which the above-mentioned drawbacks can be avoided.

2. Summary of the Invention

According to the invention, this object is attained in that there is an inner part moveable inside the outer part in the forward region or front end of which the knife is fitted. In the rear region there is an aperture for the scion where the outer part has an aperture in its forward region for the stock and in this rear region it has an aperture which can be positioned coincidentally with the aperture in the inner part and it also has an angled knife at the forward edge.

With such a device the above-mentioned object can be attained in an advantageous manner. The process includes the following steps: moving the inner part to its starting position along a direction B to the right-hand side, and moving the inner part consecutively to the left-hand side within the outer part. During that movement in the direction A, the knife disposed at the forward end of the inner part is guided through the aperture in the forward region of the outer part in an inclination angle Alpha against the stock, which projects through this aperture, wherein the aperture and its length and depth is formed by the intersection of the stock with the outer part.

In that way the notch is formed in the stock in a length and depth given by the special construction of the outer part.

In the same or in a second operation, in which the inner part is moved back to its starting position, the scion is led approximately in a counter angle Alpha' to the angle Alpha through the rear apertures of the inner and outer part at the same time and in the same position. During a following movement of the inner part, in direction A, to left-hand side the shaft of the scion is pushed against the knife disposed at the forward edge of the rear aperture in the outer part cutting the wedge on the shaft. The knife of the outer part has the same shape as the knife of the inner part. Therefore, the notch in the stock and the wedge on the shaft of the scion have the same geometry also and can be combined in a close fit.

As these working procedures can be made very shortly one after the other and without a possible contamination of the intersection planes, the success of the grafting cannot be affected by drying out or by insufficient cleanliness during the process.

According to a further advantageous embodiment of the invention, the parts moveable within each other and the knives disposed on them are V-shaped, whereas the knife for cutting the notch in the stock has a smaller aperture angle, preferably about 3 degrees, than the knife for cutting the wedge on the scion shaft so that it can be fitted into the notch by force fit. Preferably the V-edges of the knives are rounded.

When using scions with shaft diameters of 7 to 10 mm it is advantageous if the rear aperture of the inner part has a length of about 4 or 5 cm in the line of the cutting edge. Then the wedge of the scion is approximately of the same length and the depth of the wedge or the notch, respectively, is in that case about 5 to 8 mm.

If the respective barks of the stock and the scion are of a very different thickness, the depth and the length of the notch in the stock should be greater than the wedge of the scion so that, in spite of the thick bark, the cutting depth in the wood of the stock and the wedge are the same. This can be attained by adjustable edges of the outer part. They can be rotated in an upward direction or moved in a forward direction. Because of a greater aperture, the notch has a longer and deeper intersection depth than the wedge on the scion shaft.

It is also very advantageous to form the rear aperture in the inner part as the intersection of a cylinder inclined to the cutting edge. A scion fitting in this aperture can be easily held in a given angle position during cutting of the wedge. Especially for scion shafts not fitting exactly into the aperture of the inner part, it is advantageous that an abutment is situated at the forward end of the aperture against which the scion shaft is pressed by the toggle lever during the cutting of the wedge and thus held in the desired way. For holding the scion while cutting an additional locking lever disposed on the toggle lever, proves to be advantageous. In the starting position, this locking lever first presses the scion shaft against the abutment without moving it lengthwise and then, after locking it, moves it together with the inner part in forward direction.

In a further embodiment the forward and backward regions of the inner and outer parts are separated from each other and arranged parallel or one above the other and the inner parts are actuated either together or individually. In that way the device is shortened and especially the taking in and taking out of the scion is easier because of the better accessibility. The remaining wood parts can be pushed out easier after cutting.

A further advantageous possibility consists in moving in the inner part a locking part, which is moved backward against a stopper for releasing the scion shaft from the inner part and is moved against the shaft for locking and pressing it against the abutment and moving it together with the inner part forwardly for consecutive cutting.

Furthermore, it is advantageous that the shaft of the scion penetrating through the coinciding apertures in the inner and outer parts is ventured by a pushing tube which supports the translatory motion against the knife in the outer part.

Preferred embodiments are described in connection with the accompanying drawings. Modifications not specifically described, however, may be made without departing from the scope of the invention. Especially the general usefulness of the device should be noted, e.g. for vine cultures and for ornamental trees.

BRIEF DESCRIPTION OF THE DRAWINGS

FIG. 1a is a perspective view of the device according to the invention, showing the slidable inner part above the outer part;

FIG. 1b is a similar view as FIG. 1, showing only the two mutually moveable members of the device;

FIG. 2a is a perspective view of a wedge-shaped notch cut in the stock;

FIG. 2b is a side elevational view of a scion in the scale of approximately 1:1;

FIG. 3a is a partial perspective view of a second embodiment of the outer part of the device with a pivotable forward edge;

FIG. 3b is a similar view of a third embodiment of the outer part with a slidable forward edge of the aperture;

FIGS. 9a, 9b and 9c are three diagrammatic views of mutually mating stock and scion.

DESCRIPTION OF THE PREFERRED EMBODIMENT

Figure 4:
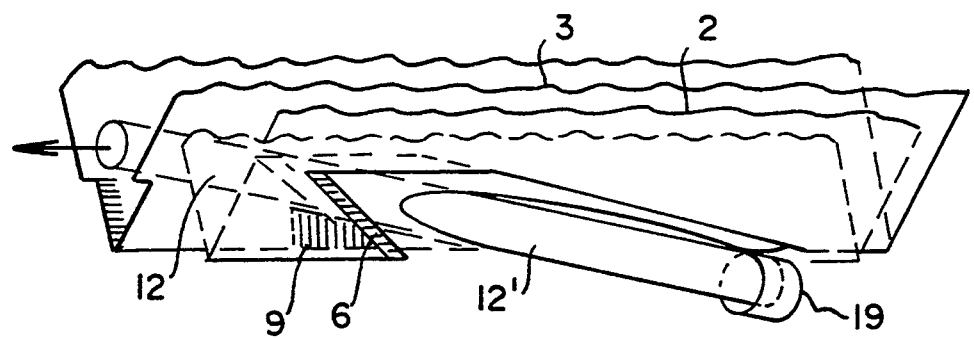
FIG. 4 is a perspective view of a scion penetrating through the inner and outer parts of the device.

FIG. 1 shows the grafting device 1 in a schematic view. The grafting device comprises two parts, preferably with similar profiles. The inner part 3 is arranged moveably in the outer part 2 and for better demonstration drawn separately as above. The inner part 3 is moved to its starting position by means of the toggle lever 31, 32, 33 to the right-hand side in direction B, and for cutting in direction A to the left-hand side. During this time a notch K is cut in the stock 10 by the knife 8 arranged on the inner part 3 and by the knife 6 the wedge K' on the scion 12. For protection the knife 8 of the inner part 3 can be placed behind the forward edge.

According to a preferred feature of the invention, the knife 8 of the inner part 3, respectively to a length of the notch K the forward region 3' has an aperture angle Beta' which is smaller than the aperture angle Beta of the knife 6 of the outer part 2 so that the wedge K' can be fitted into the notch K with a press fit.

With reference to FIG. 2, the scion 12 fits into the notch K with its cut wedge K' on the shaft 12'. The notch K is cut into the stock 10.

With reference to FIG. 3, there is shown:

a) the rotatable edge of the aperture 4 about the rotating axis 4''' for enlarging the depth of the notch. As in the case of a very thick bark, the total notch depth must be adequately deeper to get sufficiently deep into the wood of the stock. The deviance of the form of the changed aperture geometry compared with the constant form of the wedge on the shaft can be tolerated to a certain extent due to the elasticity of the wood, depending on the kind of wood. The deepening of the notch K can also be attained according to b) a parallel translation of the forward edge 4'' for creating a longer aperture region, whereas the section angle remains the same.

As shown in FIG. 4, the shaft 12' of the scion 12 is for cutting the wedge K' at the same time leading through the rear aperture 7 of the inner part 3 and the rear aperture 5 of the outer part 2 as well. The inner part 3 is then moved from this starting position in direction A. During this time the knife 6 is cutting the wedge K' on the shaft 12', which is preferably leading through an exact intersection of the lateral side planes or the body of the inner part 3, respectively, in a counter angle Alpha' to the angle Alpha.

Figure 5:
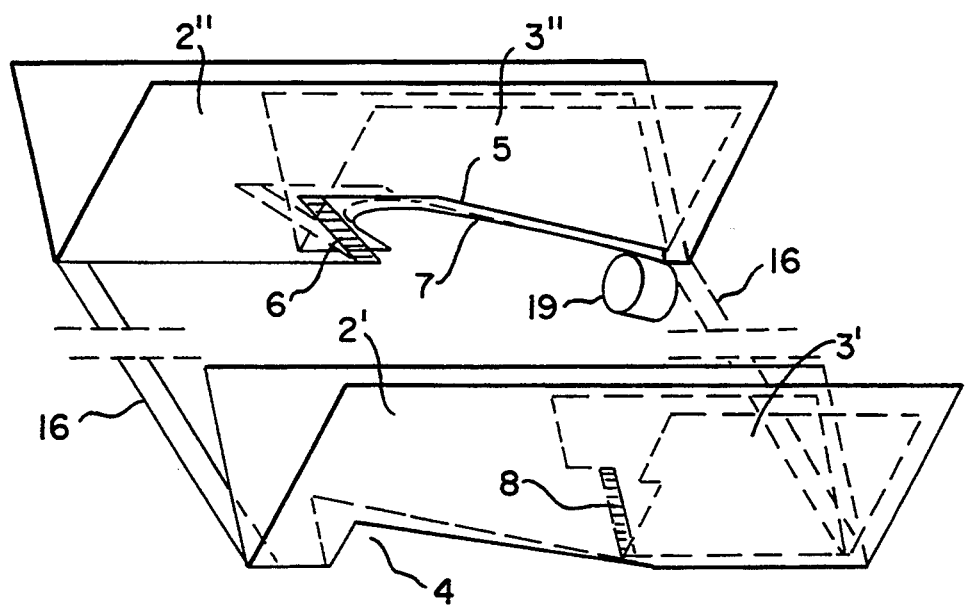
FIG. 5 is a perspective view of separated inner and outer parts showing the forward and rear regions thereof.

FIG. 5 shows an embodiment, at which the forward regions 2', 3' are separated from the rear regions 2'', 3'' of the outer parts 2 and the inner parts 3 and are formed as parallelly arranged individual devices and, as shown schematically, affixed by webs 16.

Figure 6:
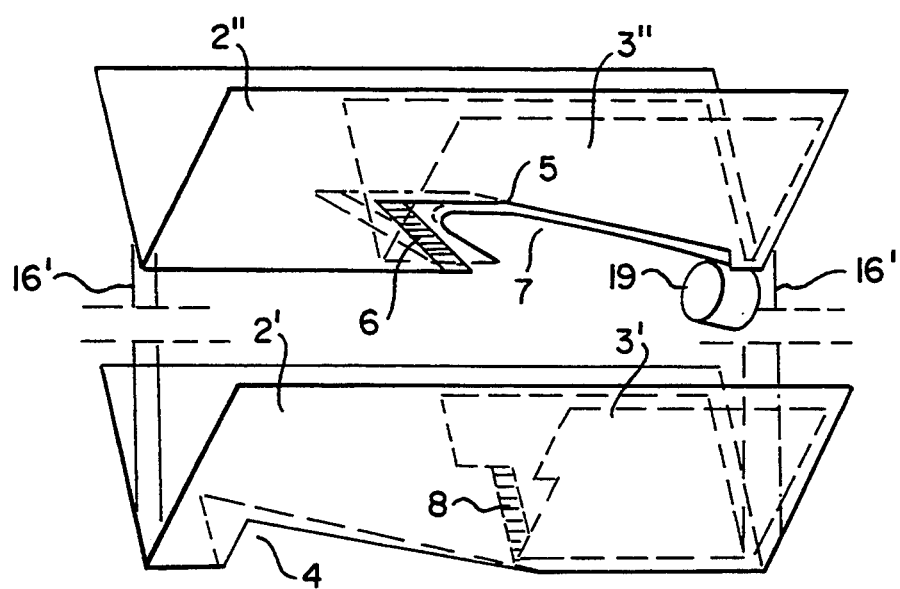
FIG. 6 is a similar view of the forward and rear regions disposed above one another.

FIG. 6 shows a further embodiment in which the rear regions 2'', 3'' are arranged above the forward regions 2', 3'. Both of these devices are, as schematically shown, affixed by webs 16'. In both of the above-mentioned embodiments, the separated devices could be driven either individually or together.

It is possible that for locking or centering the shaft 12' of the scion 12 a centering or pushing tube 19 is arranged at the rear end of the aperture 7 of the inner part 3, which exerts a force on the scion 12 during the cutting.

Figure 7:
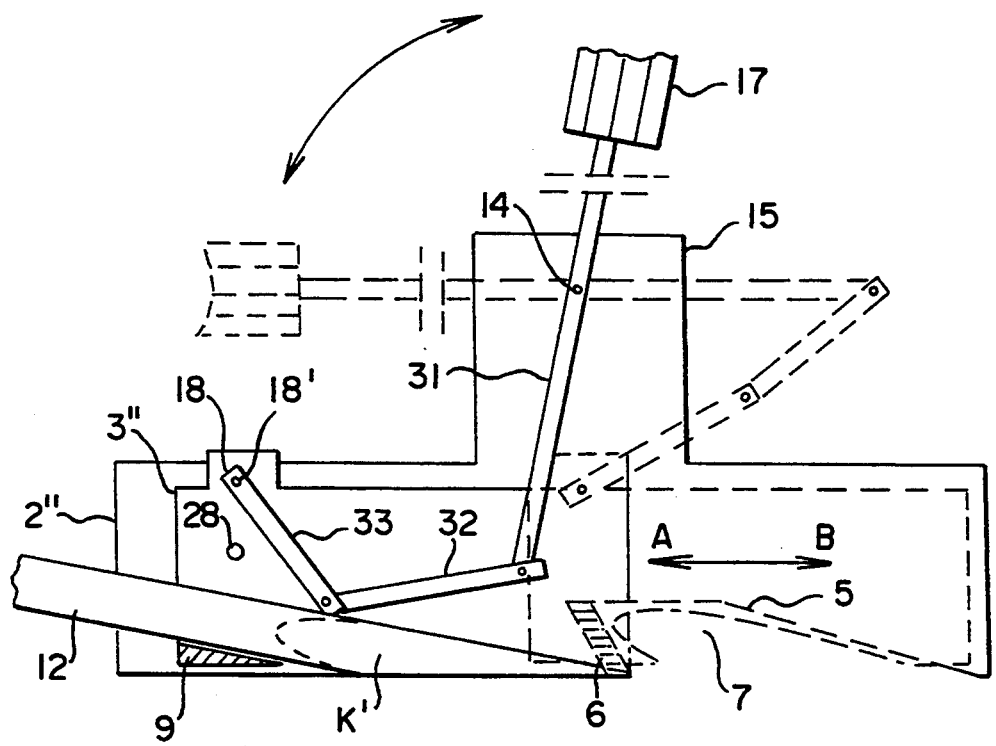
FIG. 7 is a diagrammatic elevational view showing a lever mechanism for moving the inner part and for locking the scion shaft.

FIG. 7 shows a longitudinal view of the toggle lever system 31, 32, 33 for moving the inner parts 3, 3', 3'', respectively, as demonstrated in the example of the inner part 3'', whereby the handle 17 of the lever 31 is in its end position after having cut the wedge K' while the dashed line represents the starting position. The lever 31, by which the shaft 12' of the scion 12 is pressed against the abutment 9 can be moved against a stopper 28 when the device is empty. The toggle lever system 31, 32, 33 is supported on a beam 15 mounted on the outer part 3 by means of a shaft 14 on the one hand and at the shaft 18 or at sidewards fulcrums 18' on the inner part 3 on the other hand. In the last case the lever 33 is formed as a twin lever. The movement of the inner part 3 in the direction B is made for catching the stock 10 or for loading the scion 12 into the device and then for the consecutive cutting in the direction A.

Figure 8:
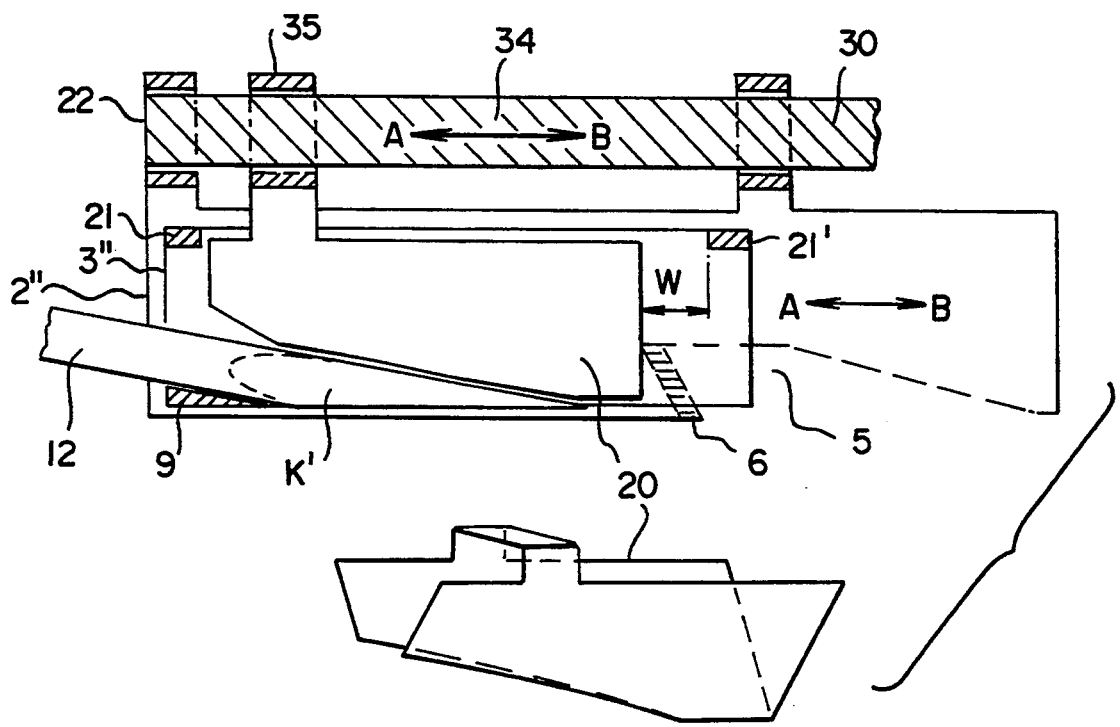
FIG. 8 is a similar view of an alternative embodiment with a screw-spindle and a cam for actuating the inner part.

FIG. 8 shows in a longitudinal section a locking part 20 moveable in the inner part 3 or 3'' respectively, which is actuated by a screw spindle 34 and a cam 35, whereby the screw spindle 34, after selection of a proper thread pitch, can be actuated by means of the spindle shaft 30 manually as well as by an electric motor. The spindle 34 is held by a beam 22, which is flanged to the outer part 2, 2', 2'', respectively. When moving the locking part 20 in the direction A, it touches either at first a loaded scion 12 or, if the device is empty, a forward stopper 21 in the inner part 3 and moves then the inner part 3 to the left-hand side. For releasing the scion 12, the locking part 20 is moved in the inner part 3 about a distance w to the right-hand side and then moves the inner part 3 by contacting it on a stopper 21' in the direction B to its starting position.

I claim:

1. Device for Vee-grafting, comprising:
   a V-shaped outer part defining a longitudinal axis;
   a V-shaped inner part adapted to slidingly move in said outer part along said longitudinal axis;
   means for moving said inner part in said outer part along said longitudinal axis;
   said V-shaped outer part having a forward aperture formed therein for partly receiving a stock into which a V-shaped groove is to be cut; and having a rear aperture formed therein for receiving a scion;
   an angled knife formed at said rear aperture for cutting the scion when said inner part is moved in said outer part along said longitudinal axis; and
   an angled knife operatively associated with said forward aperture for cutting the V-shaped groove in the stock when said inner part is moved in said outer part along said longitudinal axis.

2. The device according to claim 1, wherein said angled knives respectively formed at said rear aperture and associated with said forward aperture are V-shaped and are provided with rounded edge regions.

3. The device according to claim 1, wherein said angled knives respectively formed at said rear aperture and associated with said forward aperture are V-shaped and are provided with bow-like edge regions.

4. The device according to claim 1, wherein said angled knife formed at said rear aperture is a V-shaped knife defining a given opening angle and said knife associated with said forward aperture is a V-shaped knife defining an opening angle greater than said given opening angle.

5. The device according to claim 1, further comprising means for adjusting an edge of said forward aperture.

6. The device according to claim 1, wherein said means for moving comprise a toggle lever mechanism, said toggle lever mechanism including a locking lever for locking the scion against one of said outer and inner parts while the inner part is moved in said outer part along said longitudinal axis.

7. The device according to claim 6, further comprising stoppers projecting into a moving path of said locking lever, and including a cam and a spindle for moving said cam, said locking part being connected with said cam.

8. The device according to claim 1, further comprising a pusher tube disposed in a rear region of said inner part for centering and pushing a shaft of the scion during a cutting operation.

* * * * *